United States Patent [19]

Eiermann

[11] 4,300,391
[45] Nov. 17, 1981

[54] HOT WIRE ANEMOMETER FOR MEASURING THE FLOW VELOCITY OF GASES AND LIQUIDS (II)

[75] Inventor: Kurt Eiermann, Pfungstadt, Fed. Rep. of Germany

[73] Assignee: Deutsche Gold- und Silber-Scheideanstalt vormals Roessler, Frankfurt, Fed. Rep. of Germany

[21] Appl. No.: 48,769

[22] Filed: Jun. 15, 1979

[30] Foreign Application Priority Data

Jun. 24, 1978 [DE] Fed. Rep. of Germany ....... 2827766

[51] Int. Cl.³ .............................................. G01F 1/68
[52] U.S. Cl. .................................................. 73/204
[58] Field of Search .................................. 73/204, 116

[56] References Cited

U.S. PATENT DOCUMENTS

| | | | |
|---|---|---|---|
| 2,870,305 | 1/1959 | Ling | 73/204 X |
| 3,604,261 | 9/1971 | Olin | 73/204 |
| 3,677,085 | 7/1972 | Hayakaw | 73/204 |
| 3,900,819 | 8/1975 | Djorup | 73/204 |
| 4,215,565 | 8/1980 | Zanker | 73/204 |

FOREIGN PATENT DOCUMENTS 2649040  5/1978  Fed. Rep. of Germany ........ 73/204

*Primary Examiner*—Herbert Goldstein
*Attorney, Agent, or Firm*—Cushman, Darby & Cushman

[57] ABSTRACT

There is provided a hot wire anemometer for measuring the flow velocity of gases and liquids, especially for the intake air of internal combustion engines, with one or more temperature dependent resistances of which one or more are heated wherein there is applied to the side of the heated resistance in the direction of flow a heat insulating coating.

1 Claim, 1 Drawing Figure

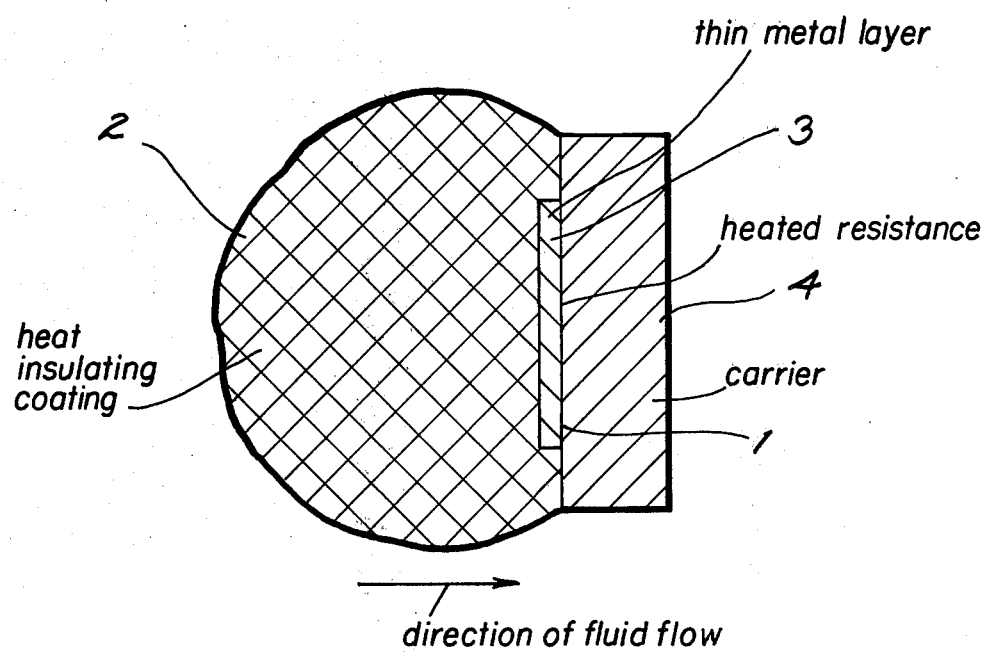

HOT WIRE ANEMOMETER FOR MEASURING THE FLOW VELOCITY OF GASES AND LIQUIDS (II)

BACKGROUND OF THE INVENTION

The invention is directed to a hot wire anemometer for measuring the flow velocity of gases and liquids, especially for measuring the flow of intake air for internal combustion engines. The anemometer is made of one or more temperature dependent resistances one or more of which are heated whereby the hot wire anemometer is stabilized through special precautions against a drift of the probe characteristic.

In the interest of maintaining the air pure it is necessary to reduce the noxious materials from internal combustion engines, especially the noxious material produced by motor vehicles. This object, among others, is attained by an improvement of the combustion discharge or exhaust. For this purpose it is necessary that there be available the most exact information as to the amounts of air being sucked in, and in fact, such information should be available with the least possible delay in time.

This information, together wih other information such as the number of revolutions and motor temperature, is supplied to an electronic control unit which ascertains the necessary amount of fuel for optimum combustion and the time of its insertion and passes the information on to a suitable regulating unit.

It has already been proposed to use for this purpose apparatuses for measuring flow in the form of orifices or venturi nozzles with suitable apparatus for measuring pressure differences. However, in both cases it is difficult in a simple manner from the slight pressure differences to obtain an electrical output signal for control of the fuel.

Futhermore, it is already known to use apparatus for the measurement of the flow velocity in which a body located in the airstream changes its position with variations in the air flow. With increasing deflection of such a body there is introduced an increasing counter force so that the body is located at a specific place in the measuring tube for each specific flow velocity.

The position of the body can only be scanned optically or mechanically and then be changed into an electrical signal. In this process the scanning and, above all, the long response time caused thereby is disadvantageous.

Also, there have already been used devices in which a propeller located in the airstream is scanned optically, mechanically or electrically (magnetically). Also, in this case the mass inertia of the propeller causes a considerable delay in the response time.

There are also known hot-wire anemometers of various constructions in which two temperature dependent resistances, usually in the form of two wires, are connected together with two temperature indenpendent resistances in a bridge. One of the temperature dependent resistances is exposed to the flow of the gas to be measured; the other is only exposed to the temperature of the gas. The disadvantage of this arrangement is that the resistance measuring the temperature of the gas must be shielded from the gas stream. In spite of this, the measurement of the flow in this arrangement is to a certain extent temperature dependent.

To avoid these disadvantages it has already been proposed in Kolb, German OS No. 2649040 to use a hot wire anemometer which contains two resistance wires of different diameter of the same material and having the highest possible temperature coefficients of resistance, which resistance wires are joined together with two fixed resistors to form a bridge and are joined with the input of a difference amplifier whose output is coupled with the bridge input.

Both wires are connected electrically in series whereby there is arranged parallel to these wires an electrical voltage divider which together with the two wires form a bridge circuit. The output voltage of this bridge circuit is led to an amplifier whose output signal controls the bridge supply current.

This apparatus has the advantage that it permits the flow velocity of gases to be measured quickly and exactly independent of the temperature of the gases whereby the measured result can be easily changed into an electrical output signal.

Hot wire anemometers in general consist of one or more temperature dependent resistances. One or more of these resistances are heat electrically so that, compared to the surrounding medium, they take on an elevated temperature. The heat loss of the heated resistance is greater than the velocity of the flowing medium. This loss of heat for example is measured in such manner that the temperature of the heated resistance is controlled to a specified, for example, constant value and the necessary heating wattage is measured as the measure for the flow velocity. Frequently there are present further temperature dependent resistances in the hot wire anemometer which resistances, however, are not heated. They take on the temperature of the flowing medium, so that their resistance value can be utilized to correct the influence of the temperature of the flowing medium.

The heat loss of the heated resistance besides being dependent on the flow velocity of the flowing medium, for example, is also dependent on the dimensions, the shape and type, as construction parts of different heat conductivities are joined to the hot resistance.

In practice it has been demonstrated that the characteristics of these anemometer probes is not stable, and in the course of time deviate from the standard characteristics. This drift above all else is traced back to the deposition of dust on the wire surface which changes the heat transfer. Erosion and deformation of the measuring wire surfaces also occurs by rebounding dust particles contained in the gas stream.

A deposition of dust and dirt which results in a coating of the hot resistance with undefined heat conducting layers changes the heat loss of these resistances. For this reason soiling strongly impairs the measuring exactness of hot wire anemometers.

Therefore it was the problem of the present invention to produce a hot wire anemometer for measuring the flow velocity of gases and liquids, especially for the intake air of internal combustion engines, the anemometer having one or more temperature dependent resistances of which one or more are heated in which the influence of soiling on the heat loss of the measuring element and thus a drifting of the probe characteristic is suppressed to the maximum amount possible by employing constructive precautions.

SUMMARY OF THE INVENTION

This problem was solved according to the invention by applying a heat insulating coating on the side of the heated resistance in the direction of flow. Preferably this resistance consists of a thin metal layer which is applied on an electrically insulating carrier.

In connection therewith it has been observed that streams of gases and liquids laden with dirt deposit on obstacles found in the stream preferably on the side turned to the stream (front side) while the side turned away from the stream (rear side) remains substantially free from dirt. On the other hand in the ordinary case both sides contribute to the removal of heat. The deposit of dirt on the front side naturally impairs only the heat removing properties. If this side is provided with a heat insulating coating the removal of heat essentially only takes place through the rear side. With sufficient insulation of the front side the heat transport through this side becomes negligible. An additional heat insulation of the front side through dirt accordingly only changes this negligible portion of the heat loss so that the heat loss in all remains practically unchanged.

BRIEF DESCRIPTION OF THE DRAWINGS

The single FIGURE of the drawing shows schematically an illustrative embodiment of the hot wire anemometer of the invention.

DESCRIPTION OF THE PREFERRED EMBODIMENTS

Referring more specifically to the drawings the heated resistance 1 preferably consisting of a thin metal layer 3 and a carrier 4 is coated on the side turned to the stream by a heat insulating coating 2. In this device it is immaterial whether there are used as temperature dependent resistances metal wires, metal ribbons or complicatedly constructed measuring resistances.

What is claimed is:

1. In a hot wire anemometer adapted to be located in a flowing fluid for the measurement of the flow velocity thereof and having at least one temperature dependent heated resistance, the improvement comprising:

said heated resistance consisting essentially of a thin metal layer applied on an electrically insulating carrier located on the downstream side of said resistance, and heat insulation covering the upstream side of said heated resistance to minimize heat transfer between said side and the flowing fluid and to render negligible any changes in said transfer occasioned by build-up of dust, or the like, on said upstream side, the downstream side of each said resistance being adapted for greater heat transfer between said downstream side and the flowing fluid than the heat transfer between said upstream side and the flowing fluid.

* * * * *